United States Patent
Carretti et al.

(10) Patent No.: US 9,878,505 B2
(45) Date of Patent: Jan. 30, 2018

(54) TOOL AND A METHOD FOR FORMING AND ASSEMBLING BEAMS OF COMPOSITE MATERIAL

(71) Applicant: ALENIA AERMACCHI S.p.A., Rome (IT)

(72) Inventors: Daniela Carretti, Foggia (IT); Gianni Iagulli, Foggia (IT); Gianpiero Lembo, Foggia (IT); Alberto Russolillo, Foggia (IT); Carmine Suriano, Foggia (IT)

(73) Assignee: ALENIA AERMACCHI S.p.A., Rome (IT)

( * ) Notice: Subject to any disclaimer, the term of this patent is extended or adjusted under 35 U.S.C. 154(b) by 452 days.

(21) Appl. No.: 14/567,584

(22) Filed: Dec. 11, 2014

(65) Prior Publication Data

US 2015/0165699 A1    Jun. 18, 2015

(30) Foreign Application Priority Data

Dec. 13, 2013 (IT) ............................... TO2013A1020

(51) Int. Cl.
*B29C 65/00* (2006.01)
*B29C 70/54* (2006.01)
(Continued)

(52) U.S. Cl.
CPC .......... *B29C 70/543* (2013.01); *B25B 11/005* (2013.01); *B29C 33/76* (2013.01);
(Continued)

(58) Field of Classification Search
CPC ..... B29C 70/30; B29C 70/541; B29C 70/543; B29C 65/7847; B25B 11/005; B29D 99/0003

See application file for complete search history.

(56) References Cited

U.S. PATENT DOCUMENTS 4,475,976 A * 10/1984 Mittelstadt ............ B29C 70/342
                                              100/211
5,092,954 A    3/1992 Braun et al.
(Continued)

FOREIGN PATENT DOCUMENTS

FR          2614387 A1 * 10/1988 ............. B66C 13/12
WO   WO 2008/155720 A2   12/2008
WO   WO 2011128110 A1 * 10/2011

OTHER PUBLICATIONS

European Search Report for corresponding European Patent Application No. 14197584 dated May 13, 2015.
(Continued)

*Primary Examiner* — John Goff
(74) *Attorney, Agent, or Firm* — Merchant & Gould P.C.

(57) ABSTRACT

A tool for forming a C-section beam made of carbon fiber includes a straight elongated mandrel with a rectangular or trapezoidal cross-section. The mandrel has three consecutive outer faces, with a planar face configured to form a surface of the web of the C-section beam, and two opposing lateral faces, configured to form two respective surfaces of the flanges of the C-section beam. The mandrel has a distributed perforation on at least one of the three outer faces and an inlet/outlet connection to connect the mandrel to an external source of vacuum and/or compressed air. Passages are formed inside the mandrel to establish a fluid communication between the distributed perforation and the inlet/outlet connection. Through the distributed perforation, a vacuum is applied to the interface between the mandrel and the C-section beam to retain the C-section beam on the mandrel while lifted and turned by 180° for coupling to a similar C-section beam to assemble an H-beam. Applying compressed air through the perforation facilitates the removal of the C-section beam from the mandrel at the end of the compaction step.

5 Claims, 6 Drawing Sheets

(51) Int. Cl.
     *B29C 33/76*      (2006.01)
     *B29D 99/00*      (2010.01)
     *B29C 70/30*      (2006.01)
     *B25B 11/00*      (2006.01)
     *B29C 70/32*      (2006.01)
     *B29L 31/00*      (2006.01)

(52) U.S. Cl.
     CPC .............. *B29C 70/30* (2013.01); *B29C 70/32* (2013.01); *B29D 99/0003* (2013.01); *B29L 2031/003* (2013.01); *B29L 2031/772* (2013.01)

(56) References Cited

U.S. PATENT DOCUMENTS

| | | |
|---|---|---|
| 2006/0108057 A1 | 5/2006 | Pham et al. |
| 2007/0251641 A1 | 11/2007 | Santos Gomez et al. |
| 2011/0005666 A1* | 1/2011 | Burchell ............. B29C 33/3814 156/242 |
| 2013/0174969 A1* | 7/2013 | Karb ....................... B29B 11/16 156/196 |

OTHER PUBLICATIONS

Italian Search Report for corresponding Italian Patent Application No. TO2013A001020 dated Aug. 22, 2014.

\* cited by examiner

TOOL AND A METHOD FOR FORMING AND ASSEMBLING BEAMS OF COMPOSITE MATERIAL

This application claims benefit of Ser. No. TO2013A001020, filed Dec. 13, 2013 in Italy and which application is incorporated herein by reference. To the extent appropriate, a claim of priority is made to the above disclosed application.

BACKGROUND OF THE INVENTION

The present invention relates to a method and to a tool for the forming and the assembly of "H-beams" made of fibre-reinforced polymerizable thermosetting composite material.

PRIOR ART

For a better understanding of the prior art and of the problems inherent to it, the steps for assembly of an H-beam according to a conventional method will first of all be described. As illustrated schematically in FIG. 1, an H-beam 5 is formed by the coupling of two C-section beams 10, 16 made of carbon fibre. The two C-section beams 10, 16 are joined by superposing the two webs 14, 20. Subsequently, filling elements 22 with a triangular cross-section are applied. The H-beam 5 thus assembled is then subjected to a compaction and hot forming step, and is lastly cured in an autoclave.

Both the operations prior to the compaction step and those that follow it require various processing times and procedures which can affect in various ways the formation of the beam, both in terms of lengthening of the production times and of the quality and suitability for use of the beam.

Generally, the manufacturing process for the H-beam starts from a plane sheet made of carbon fibre, picked up and placed onto a forming tool comprising an elongated mandrel of appropriate shape that reproduces the shape that the plane sheet has to copy. In order for the forming process to take place, the plane sheet, disposed on the mandrel, is subjected to the application of vacuum and heat, inside a suitable thermo-forming station equipped with an elastic membrane. Under the application of the vacuum, the membrane adheres to the plane sheet, forcing it to bend and to reproduce the outer contour of the mandrel, according to procedures known per se (see, for example, patent publication WO 2008/155720 A2). The same processing steps are applied to a second plane sheet. Two beams 10, 16 are thus obtained that each have a C-shaped cross-section. Such a cross-section defines a central web 14, 20 from the sides of which two outer flanges 12, 13, 18, 19 extend that are mutually parallel and perpendicular to the web 14, 20. The web 14, 20 has an outer (or back) surface 14a, 20a and an inner surface 14b, 20b. The flanges 12, 13, 18, 19 have inner surfaces 12a, 13a, 18a, 19a. The procedure provides for at least one of the two C-section beams 10, 16 to be lifted, turned over by 180° and placed onto the other C-section beam, in such a manner as to make the outer backs 14a, 20a of the two webs 14, 20 coincide. An H-beam 5 is thus obtained. The H-beam thus assembled is transferred into a compacting station, in which it is subjected to a hot forming step, according to procedures known per se. Successively, the H-beam is transferred onto a curing tool, together with other elements, and finally into an autoclave, where it undergoes a polymerization treatment by means of the combined action of pressure and heat.

SUMMARY OF THE INVENTION

A general object of the present invention is to optimize and speed up the handling operations with which a carbon fibre H-beam is assembled, and at the same time improve the quality of the finished product. Then, in particular, it is desired to improve the standard of finishing of the surfaces of the finished H-beam. One typical objective is to avoid the finished H-beam exhibiting marks/holes caused by holding means conventionally used in the assembly step for processing the C-section beams on the respective forming mandrels. A further specific object is to speed up the operations for removal of the assembled H-beam from the forming and assembly tools. Yet another object is that of reducing the manual operations, generally slow and costly, to a minimum.

In summary, a tool is implemented for forming a beam having a C cross-section made of fibre-reinforced polymerizable thermosetting composite material, typically carbon fibre. The forming tool comprises a mandrel having a shape elongated in a given direction and substantially rectangular or trapezoidal cross-section. The mandrel has three consecutive outer faces, which comprise a planar face configured to form a surface of the web of the C-section beam, and two opposing lateral faces configured to form two respective surfaces of the flanges of the C-section beam. The mandrel has a distributed perforation on at least one of the aforementioned three outer faces and at least one inlet/outlet connection for connecting the mandrel to at least one external source of vacuum and/or compressed air. One or more passages are formed inside of the mandrel, which establish a fluid communication between the distributed perforation and the inlet/outlet connection.

The distributed perforation can perform the dual function of
- applying a vacuum to the interface between the mandrel and the C-section beam for holding the C-section beam on the mandrel while the latter is lifted and turned over by 180° in order to be coupled to a similar C-section beam, obtaining an H-beam; and
- applying compressed air to the aforementioned interface so as to facilitate the removal of the C-section beam from the corresponding mandrel at the end of the compaction step.

The uniform action of the pneumatic force for forming and for expulsion allows beams of a high quality to be obtained, and also the steps for preparation and for assembly of the component parts of the H-beam by polymerization to be speeded up.

In some solutions, with the aim of facilitating the removal of the C-section beam from the mandrel, mandrels may be preferred having a trapezoidal cross-section to mandrels with a square or rectangular cross-section. The present method pneumatically assists the expulsion of the C-section beam from the mandrel and accordingly favours the use of mandrels with a rectangular, or slightly trapezoidal, cross-section that form H-beams with substantially parallel flanges.

BRIEF DESCRIPTION OF THE DRAWINGS

The structural and functional features will now be described of some preferred, but non-limiting, embodiments of a forming tool and of a method for forming beams according to the invention. Reference will be made to the appended drawings, in which.

DETAILED DESCRIPTION

Figure 2:
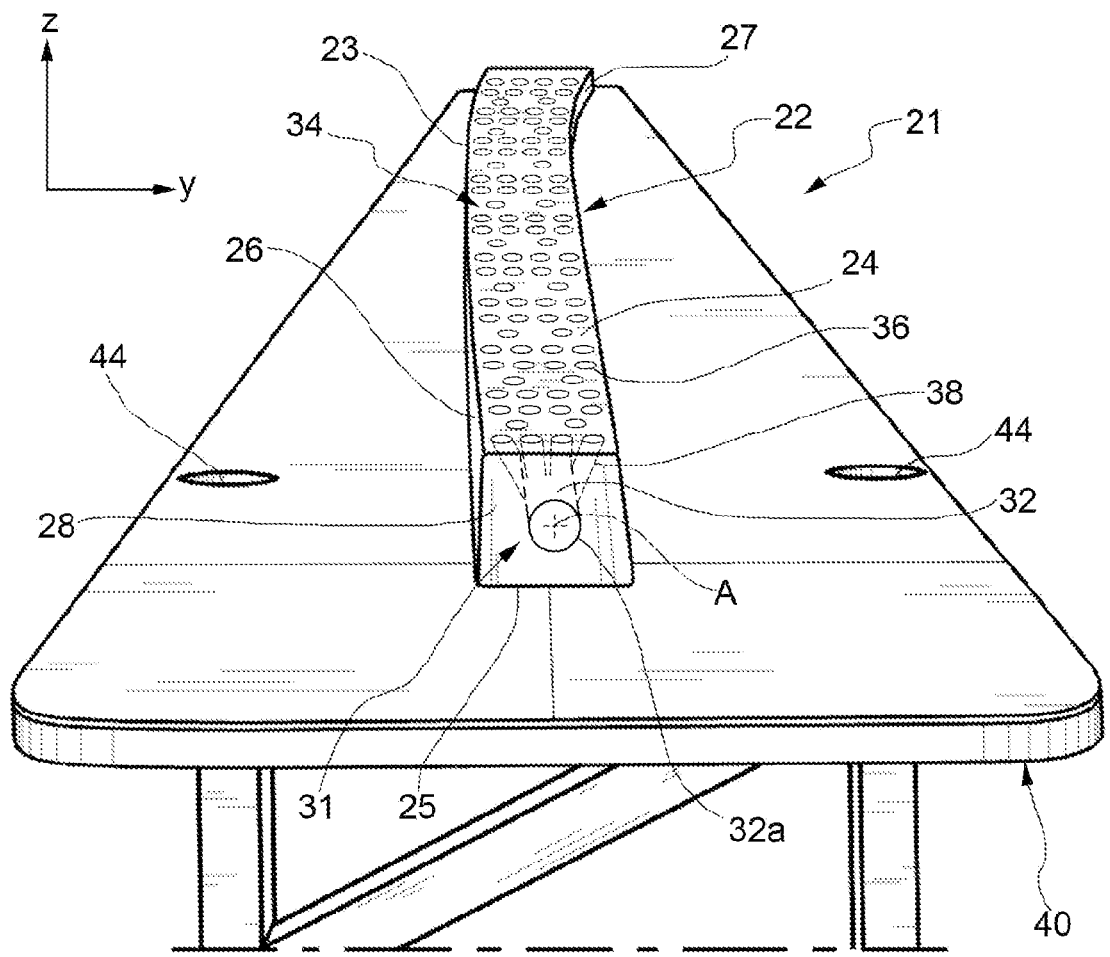
FIG. 2 is a schematic perspective view that illustrates a forming tool according to one embodiment of the invention.
Figure 3:
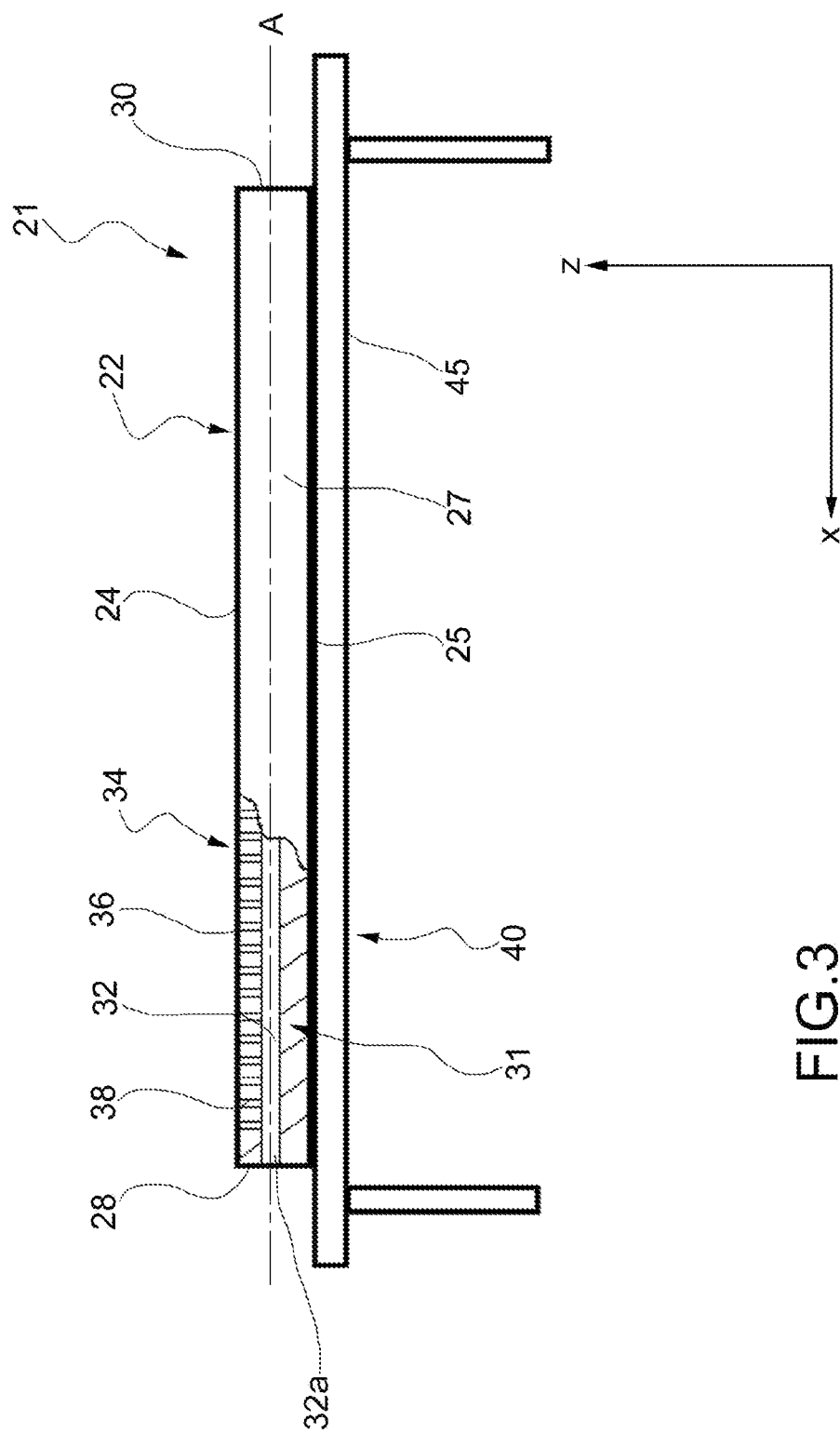
FIG. 3 is an axial cross-sectional view of the tool in FIG. 2.

Initially making reference to FIGS. 2 and 3, a forming tool is indicated overall by 21. The tool 21 comprises a forming mandrel 22 having a rigid body 23 of substantially rectangular or slightly trapezoidal cross-section, extending longitudinally along an axis A parallel to a geometric axis x. Throughout the present description and in the claims, the terms and the expressions indicating positions and orientations, such as "longitudinal" or "transverse", are referred to the x axis. The rigid body 23 is solidly fixed to a rigid plane plate 40, having a preferably smooth surface 42 which extends all around the mandrel 22.

The mandrel 22 has three outer perimeter faces 24, 26, 27, besides an interface surface 25 with which the mandrel 22 is solidly attached to the rigid plane plate 40.

The outer plane face 24 of the mandrel 22 has a distributed perforation 34, comprising a plurality of holes 36 that run in a direction transverse to the longitudinal axis A of the mandrel 22. The holes 36 are preferably distributed in a uniform manner over the surface 24 of the mandrel 22.

The diameter of the holes 36 which open onto the outer plane surface 24 can vary according to the requirements. Optimum results, in terms of efficacy and of quality of the surface formed have been achieved with holes 36 having a diameter of around 3 mm. Preferably, the diameter of the holes 36 is in the range between 2 mm and 4 mm.

A plurality of secondary ducts 38 puts the holes 36 into communication with a primary duct 32 which runs along the inside of the mandrel 22; in the embodiment illustrated, the primary duct 32 runs along an axis parallel or coinciding with the longitudinal axis A of the mandrel 22.

Figure 6:
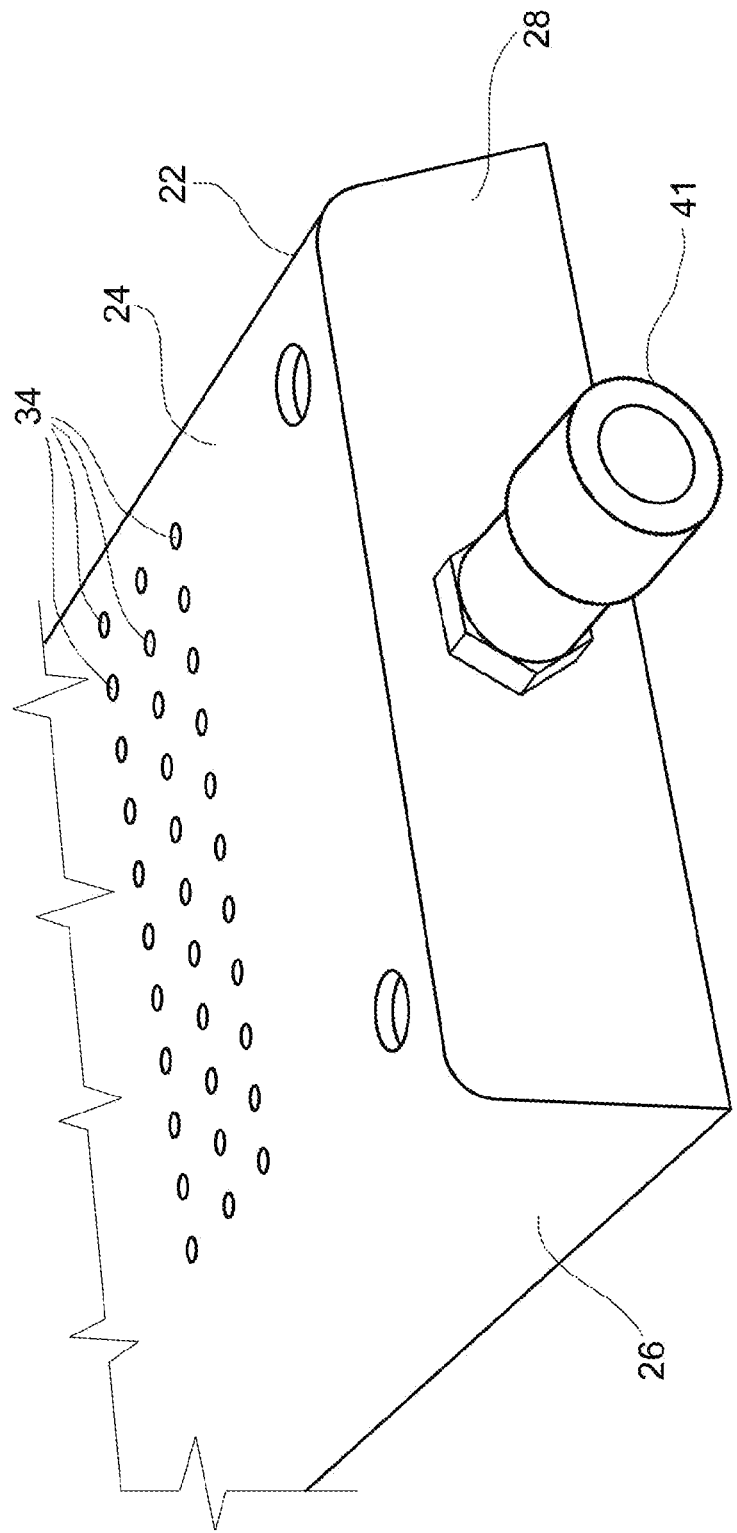
FIG. 6 is a perspective view of an end part of a forming tool.

The primary duct 32 can be supplied, alternately, by two external sources (not shown), respectively a source of vacuum and a source of compressed air. The connection between the external sources and the primary duct 32 can be made by means of an inlet/outlet connector 41 disposed at one end of the primary duct 32 (FIG. 6). The connector 41 may for convenience be of the automatic quick-connect type.

In the embodiment illustrated in FIG. 3, the primary duct 32 has one outlet 32a on a front face 28 of the mandrel 22, into which outlet 32a the connector 41 can be inserted.

The primary duct 32, together with the secondary ducts 38, forms a series of passages, indicated overall by the number 31, which establish a fluid communication between the distributed perforation 34 and the inlet/outlet connector 41.

In another embodiment (not shown), the primary duct 32 can have two outlets, respectively on the front face 28 and on an opposing rear face 30, into which outlets two inlet/outlet connectors 41 can respectively be inserted, for example two automatic quick-connects.

In an alternative embodiment (not shown), the primary duct 32 does not have any outlets on either the front face 28 or on the rear face 30, but achieves fluid communication with the external sources of vacuum and/or compressed air by means of one or more outlets passing through the rigid plane plate 40. According to such a variant, the outlets are oriented in a transverse direction with respect to the longitudinal axis A of the mandrel 22.

In another embodiment (not shown), the distributed perforation 34 is formed, other than on the plane outer face 24, also on the lateral outer faces 26.

According to a further embodiment (not shown), the distributed perforation 34 can be formed only on the lateral outer faces 26, rather than on the plane outer face 24.

Figure 4:
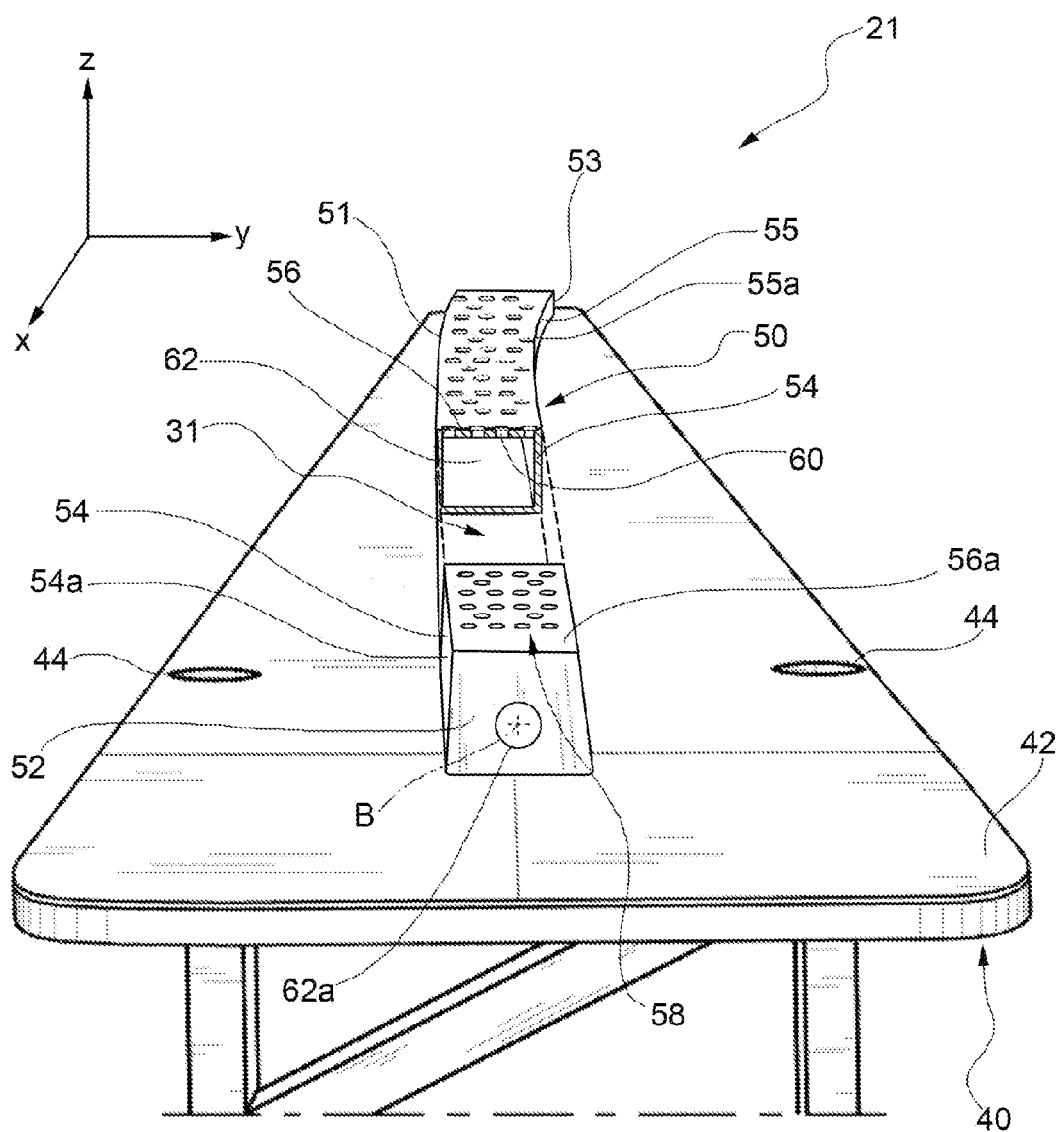
FIG. 4 is a schematic perspective view that illustrates a forming tool according to a further embodiment of the invention.

In a further embodiment, schematically shown in FIG. 4, the mandrel 50 has a rigid box-like structure 51, comprising five perimeter walls 52, 53, 54, 55, 56 that bound an internal hollow chamber 62. The walls 54, 55, 56 have respective outer faces 54a, 55a, 56a. The internal hollow chamber 62 forms a fluid communication between the external sources of vacuum and/or compressed air and a distributed perforation 58 that comprises a plurality of through-holes 60 formed through the plane wall 56.

In an embodiment, the through-holes 60 may be formed through both the plane wall 56 and also through the lateral walls 54, 55.

More generally, it is sufficient for the through-holes 60 to be formed through at least one of the walls 54, 55, 56, so as to open onto at least one of the outer faces 54a, 55a, 56a.

In all the possible embodiments, the mandrel may indifferently have a rectangular cross-section, with two opposing parallel faces 54a and 55a, or else trapezoidal, with two opposing faces 54a and 55a slightly converging towards the outer face 56a. In other words, the outer face 56a forms an angle greater than or equal to 90° with each of the two opposing faces 54a and 55a. These preferable configurations serve to avoid the formation of wrinkles on the external surfaces of the C-section beam not yet polymerized at the end of the compaction step, when the C-section beam is removed from the mandrel. In the case in which it is required for the C-section beam to assume a final configuration such as that for which the two opposing faces 54a and 55a converge towards the outer face 56a according to angles of less than 90°, such a configuration will be able to be imparted to the C-section beam in a successive processing step.

Hereinbelow, one exemplary sequence is now described of a method (with reference to FIGS. 5A to 5G) for the assembly of H-beams 5, making use of mandrels 22, 22' for forming with a distributed perforation 34, 34'. The method is described with reference to mandrels of the type illustrated in FIGS. 2 and 3; it will be understood that the same operational steps may also be applied in an analogous manner with mandrels 50 of the type illustrated in FIG. 4.

Figure 5A:
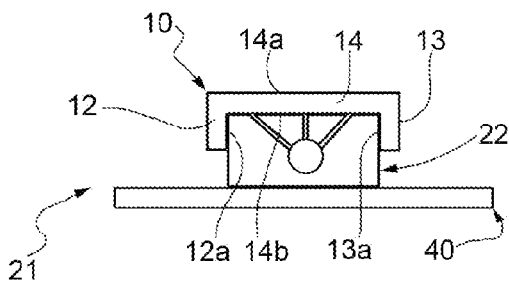
FIGS. 5A to 5G illustrate schematically a sequence of a procedure for the forming of H-beams, making use of mandrels for forming with a distributed perforation.
Figure 5A:
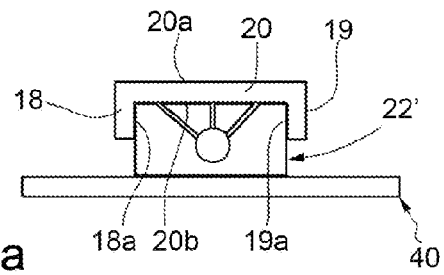

The method is carried out starting from two C-section beams 10, 16 each having a cross-section substantially in the shape of a C. The C-section beams 10, 16 are made from fibre-reinforced polymerizable thermosetting composite material, typically carbon fibre. The C-section beams 10, 16 are preformed and non-polymerized (uncured). Each C-section beam is applied on three consecutive perimeter faces 24, 26, 27, 24', 26', 27' of a first mandrel 22 and of a second mandrel 22'; the perimeter faces comprise a planar face 24, 24' and two lateral faces 26, 27, 26', 27' (FIG. 5A).

Figure 5B:
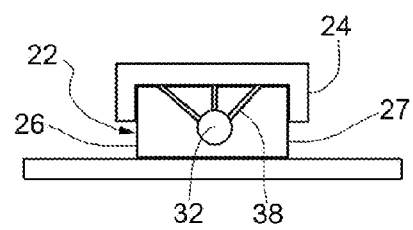
Figure 5B:
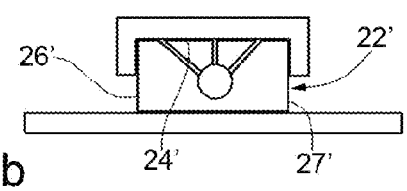

An external source of vacuum (not shown) can be connected to the connector 41 and put into fluid communication with the distributed perforation 34 of the first mandrel, exerting a suction force that holds the C-section beam 10 onto the mandrel 22 (FIG. 5B).

Optionally, an analogous suction force (not necessarily having the same intensity) may also be applied to the second mandrel 22'; the aforementioned suction force may optionally also be applied to the second mandrel 22' in the steps that will be described hereinbelow.

Figure 5C:
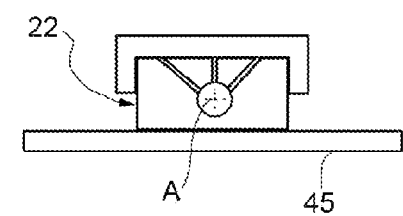

Using appropriate moving means, not illustrated and known per se (see, by way of example, the Patent publication WO 2008/155720 A2), the first mandrel 22 is lifted in a direction substantially perpendicular to the direction of the longitudinal axis A of the mandrel 22 (FIG. 5C). Subsequently, the first mandrel 22 may be translated horizontally in order to end up superposed onto the second mandrel 22' (FIG. 5D), in such a manner that the longitudinal axes A, A' of the two mandrels 22, 22' are lying in the same vertical plane.

According to another different embodiment, during the steps hitherto described there may be no suction force applied to the two mandrels 22, 22'.

The lifting and translation operations described above, such as the overturning to which reference is made hereinbelow, may conveniently be carried out by a travelling crane equipped with a pick-up system comprising a series of suction cups connected to a suction system, and a series of extendable and retractable pins which are engaged into centering holes 44, arranged for this purpose on the surface 42 of the rigid plane plate 40. A travelling crane with a pick-up system designed for this purpose is known from WO 2008/155720 A2.

Figure 5D:
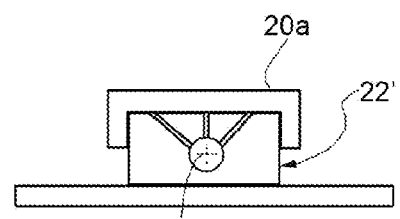
Figure 5D:
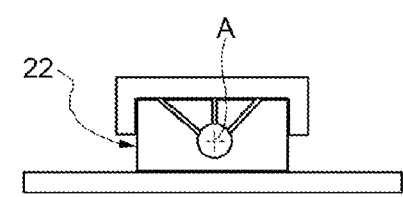
Figure 5E:
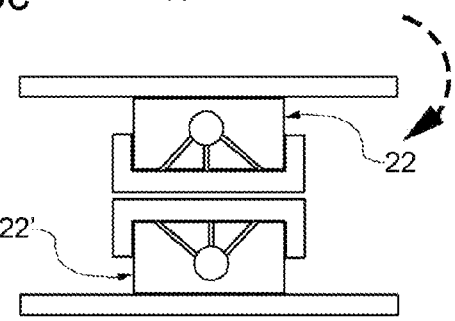

Once the two mandrels 22, 22' are arranged according to the configuration illustrated in FIG. 5D, the first mandrel 22, which is in a raised position along the z axis with respect to the second mandrel 22', is rotated by 180° about its own longitudinal axis A (FIG. 5E). In this step, the suction force exerted by the external source of the vacuum on the C-section beam 10, via the distributed perforation 34, holds the C-section beam 10 on the mandrel 22 even in an upside-down position. In such a configuration, the backs 14a, 20a of the webs 14, 20 of the two C-section beams 10, 16 end up facing each other and spaced apart.

Figure 5F:
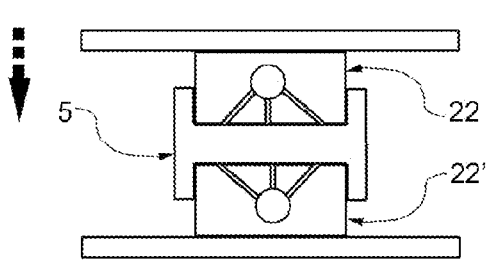
Figure 5G:
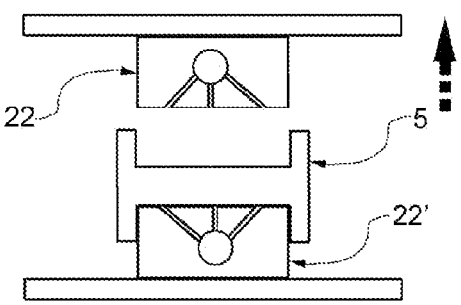

Accordingly, the mandrels 22, 22' are brought towards one another until the backs 14a, 20a of the webs 14, 20 of the two C-section beams 10, 16 come into contact (FIG. 5F). This step can be conveniently carried out by lowering the first (upper) mandrel 22 onto the second (lower) mandrel 22'.

Figure 1:
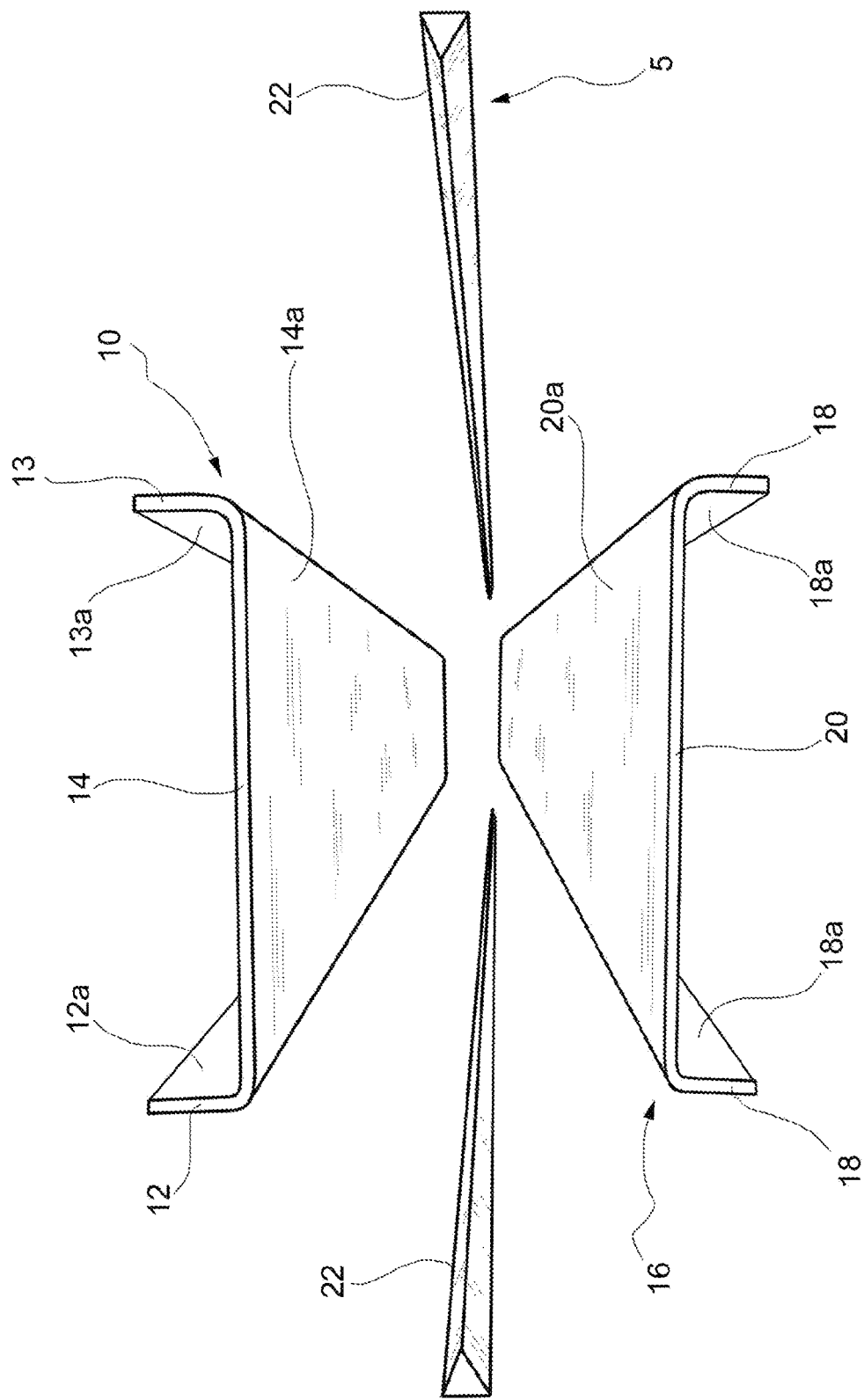
FIG. 1 is an exploded perspective view of the components of a carbon fibre H-beam.

The step for juxtaposing and contacting the backs 14a, 20a of the webs 14, 20 of the two C-section beams 10, 16 may be followed by a step of applying filling elements of the type indicated by 22 in FIG. 1 along two longitudinal recesses which are located in the connection areas between the webs 14, 20 and the flanges 12, 13, 18, 19 of the C-section beams 10, 16.

The assembly of the two mandrels 22, 22' and of the respective coupled C-section beams 10, 16 can thus be transferred as a single unit into a final compacting station (not shown), where the assembled H-beam 5, formed from the coupled C-section beams 10, 16 (and, potentially, from the filling elements 22), is subjected to the action of the vacuum. During the step for transferring to the compacting station and during the compaction step, the suction force can be maintained on one or both the mandrels 22, 22' so as to guarantee the stability of positioning of the H-beam 5. The operations for compaction with hot forming are known per se in the technology and are not described here.

Once the compaction step is finished, the first mandrel 22 is connected to the external source of compressed air which, acting on the H-beam 5 via the distributed perforation 34, facilitates the removal of the H-beam 5 from the first mandrel 22. The first mandrel 22 is taken away (FIG. 5E). According to one favoured embodiment, the second mandrel 22' is also pressurized, in such a manner that the consequent expulsion force assists the removal of the H-beam 5 also from the second mandrel 22'. In this way, both the speed of processing and the quality of the manufacturing are guaranteed.

As far as the preferred values of vacuum and pressure of the air to be applied to the process are concerned, such values can respectively be around 700 mmHg (93.3 kPa) and around 2000 mmHg (266.6 kPa). These values are indicative and not to be taken as limiting.

According to another embodiment (not shown), the two mandrels 22, 22' (initially positioned at the same level) are both rotated by 90° with respect to their own longitudinal axes A, A', according to appropriate directions of rotation so as to bring the backs 14a, 20a of the webs 14, 20 of the two C-section beams 10, 16 into positions facing each other and spaced apart in a substantially horizontal direction y. The backs 14a, 20a of the webs 14, 20 of the two C-section beams 10, 16 are therefore brought together until they come into mutual contact. The filling elements 22 may be applied to the non-polymerized H-beam 5 thus obtained, according to the procedure previously described. During one or more steps just described, it is recommended to apply a suction force to both the mandrels 22, 22', so as to guarantee the anchoring of the respective C-section beams 10, 16 to the mandrels 22, 22'. The assembled H-beam may then be subjected to the same steps for compaction and removal previously described.

Various aspects and embodiments of the forming tool have been described, together with various embodiments of the method for the assembly of beams. It will be understood that each embodiment may be combined with any other embodiment. Moreover, the invention is not limited to the embodiments described, but could be varied within the scope defined by the appended claims.

What is claimed is:

1. A method for forming and assembling H-beams of fiber-reinforced polymerizable thermosetting composite material, the method comprising:
   providing a first mandrel and a second mandrel, each mandrel having an elongated shape defining an axis and a substantially rectangular or trapezoidal cross-section, the mandrel providing three consecutive outer faces including a planar face configured to form a surface of a web of a C-section, and two opposite side faces configured to form two respective surfaces of flanges of the C-section;
   wherein each mandrel provides:
      a distributed perforation on at least one of said outer faces;
      at least one inlet/outlet connection for connecting the mandrel to at least one external source of vacuum and/or pressurized air; and
      one or more passages within the mandrel, said passages establishing fluid communication between the distributed perforation and said inlet/outlet connection;
   providing two C-sections of fiber-reinforced polymerizable thermosetting composite material;
   applying the two C-sections on the three consecutive outer faces of each mandrel,
   connecting the inlet/outlet connection of at least one of the mandrels to at least one external source of vacuum, wherein a suction force is exerted that holds a C-section on said at least one of the mandrels;

rotating said at least one of said first mandrel and said second mandrel about an axis parallel to said axis of said at least one of said first mandrel and said second mandrel, while applying an at least partial vacuum to the passages within the mandrel being rotated, to retain the C-section adhering to the mandrel being rotated, arranging the C-sections carried by the first and second mandrels facing one another;

bringing the two mandrels nearer to one another so as to bring the two C-sections in contact with one another, thus obtaining an H-beam, transferring the mandrels and the H-beam to a compacting workstation;

compacting the H-beam by hot forming;

injecting pressurized air in the inner passages of at least one mandrel, so as to facilitate the removal of the compacted H-beam from the mandrel.

2. The method of claim 1, wherein the pressurized air is blown trough both mandrels, to facilitate removal of the compacted H-beam from the mandrels.

3. The method of claim 1, wherein a vacuum of about 700 mmHg (93.3 kPa) and pressurized air at about 2000 mmHg (266.6 kPa) are applied to the internal passages of the mandrels.

4. The method of claim 1, wherein each of said mandrels has a box-like structure, the box-like structure having an internal, longitudinally extending hollow chamber, said internal hollow chamber providing fluid communication with the inlet/outlet connection, and wherein the internal hollow chamber is delimited by outer walls, wherein the distributed perforation is formed through at least one of the outer walls, and wherein said distributed perforation is formed through the outer wall to provide fluid communication between an outer surface of the outer wall and the inner hollow chamber.

5. The method of claim 1, wherein the distributed perforation comprises a plurality of holes uniformly distributed on said at least one of said outer faces.

* * * * *